United States Patent [19]

Gras et al.

[11] 4,355,058
[45] Oct. 19, 1982

[54] POWDERY COATING MEDIA AND THEIR USE

[75] Inventors: Rainer Gras, Herne; Johann Obendorf, Dorsten; Elmar Wolf, Herne, all of Fed. Rep. of Germany

[73] Assignee: Chemische Werke Huels Aktiengesellschaft, Marl, Fed. Rep. of Germany

[21] Appl. No.: 933,583

[22] Filed: Aug. 14, 1978

[30] Foreign Application Priority Data

Aug. 25, 1977 [DE] Fed. Rep. of Germany ....... 2738270

[51] Int. Cl.³ .................... C08G 59/40; C08G 59/56; C08G 18/58
[52] U.S. Cl. ...................................... 427/386; 427/27; 427/195; 525/110; 525/111; 525/438; 525/528; 528/45; 528/94; 528/117; 528/367; 524/77
[58] Field of Search ...................... 528/45, 117, 367; 525/438, 528, 110, 111; 260/37 EP; 427/195, 386

[56] References Cited

U.S. PATENT DOCUMENTS

| | | | |
|---|---|---|---|
| 3,442,974 | 5/1969 | Bremmer | 260/831 |
| 3,891,602 | 6/1975 | Hughes | 260/47 EN |
| 3,896,082 | 7/1975 | Rensmann et al. | 260/47 EN |
| 3,956,237 | 5/1976 | Doorakian et al. | 260/47 EN |

Primary Examiner—Earl A. Nielsen
Attorney, Agent, or Firm—Oblon, Fisher, Spivak, McClelland & Maier

[57] ABSTRACT

Storage stable epoxy resin powder coating compositions are disclosed, which contain a solid epoxy resin and, as hardening agent, a blocked polyisocyanate compound or isocyanate terminated polymer, wherein the blocking agent is an imidazoline compound.

10 Claims, No Drawings

POWDERY COATING MEDIA AND THEIR USE

SPECIFICATION AND EXAMPLES

Various heat-hardenable epoxy resins have already been described. Dicyandiamide and polycarboxylic anhydrides are the most frequently used epoxy resin-heat hardeners. Both the polycarboxylic anhydride and dicyandiamide/epoxide mixtures have almost unlimited storage stability, but they have the disadvantage that their hardening requires excessively high temperatures or too long hardening times. It is disclosed as a significant technical advancement in DT-05 No. 22 48 776 that by using imidazoline derivatives as hardeners in epoxy resin powder lacquers the necessary hardening temperatures and times are made considerably lower and shorter, respectively, than in powder lacquer systems formulated with the usual hardeners (like polycarboxylic anhydrides and dicyandiamide).

There is, furthermore, great interest in hardeners, the mixtures of which with 1,2-epoxide compounds are stable in storage and also harden rapidly at elevated temperatures.

There have now been found hardeners/1,2-epoxide compound combinations which combine, surprisingly, the most important advantages of the above mentioned hardening agents without possessing their disadvantages.

An object of the invention is powdery coating media with high storage stability and a grain size smaller than 0.25 mm, preferably between 0.02 and 0.6 mm, on the basis of 1,2-epoxide compound with more than one 1,2-epoxide group in the molecule and a lower fusion point of >40° C., hardening agents and the usual lacquer additives, wherein the coating medium contains as hardening agents polyisocyanates blocked with cyclic amidines of the general formula:

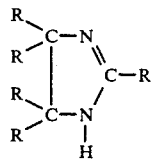

wherein the R's are the same or different substituents selected from the group of hydrogen, alkyl, cycloalkyl, aralkyl and aryl radicals, with the hardening agent present in the amount of 2–15 wt.%, referred to the quantity of solid 1,2-epoxide compound. The hardeners of the invention are extremely compatible with most epoxy resins and provide homogeneous melts at elevated temperatures which are very well suited to the production of sinter powders. The hardenable mixtures of the invention are stable in storage at room temperature; the hardening times lie in the range of 25–5 minutes for the temperature interval of 140°–200° C. The hardening mechanism is presumably complex. For one thing, the homopolymerization of the 1,2-epoxide groups is catalyzed by the basic N of the compounds of the invention, while for another, there occurs in the hardening a deblocking of the hardeners into the cyclic amidines and the polyisocyanates. The amidine set free in turn catalyzes the homopolymerization of the 1,2-epoxide groups, while the liberated NCO groups react with the OH groups of the epoxy resin via an NCO/OH reaction with formation of urethane linkages. Also the oxazolidinone formation through reaction of NCO groups with epoxide groups must not be ignored. The hardened coatings or coverings are distinguished by very good chemical and mechanical properties.

For the production of the mixtures of the invention, which are to be used as powder lacquers, are particularly suited hydroxyl group-containing 1,2-epoxide compounds with more than one 1,2-epoxide group in the molecule and a lower fusion point of >40° C. Compounds with these characteristics are, on the one hand, polyepoxide compounds, which are solid at 40° C. and below, into which fall higher molecular weight compounds (so-called solid resins) and such that are solid because of their symmetrical structure and the size of the hydrocarbon systems bound to the 1,2-epoxide group and, on the other hand, compounds as have been produced by reaction of liquid 1,2-epoxide compounds with more than one epoxide group per molecule, with primary and secondary amines in such quantities that the adduct still contains, at least on the average, one 1,2-epoxide group per molecule.

The 1,2-epoxide compounds can be both saturated and unsaturated as well as aliphatic, cycloaliphatic, aromatic and heterocyclic. Further, they can contain such substituents as cause no disturbing side reactions under the mixing and reacting conditions. Alkyl or aryl substituents, ether groupings and the like produce no side reactions.

Of the solid resins those preferred for this application are 1,2-epoxide compounds with more than one epoxide group in the molecule, the epoxy-equivalent weight of which lies between 500 and 2000. These are the solid, polymer polyglycidylpolyethers of 2,2-bis (4-hydroxyphenyl)-propane, obtained for example by reaction of 2,2-bis (4-hydroxyphenyl)-propane with epichlorohydrin in mole ratios of 1:1.9–1.2 (in the presence of an alkali hydroxide in aqueous medium). Polymer polyepoxides of this type can also be obtained by conversion of a polyglycidylether of 2,2-bis (4-hydroxyphenyl)-propane with less than the equimolecular amount of bivalent phenol, preferably in the presence of a catalyst such as a tertiary amine, a tertiary phosphine or a quaternary phosphonium salt. The polyepoxy can also be a solid epoxidized polyester obtained, for example, by conversion of a polyvalent alcohol and/or a polybasic carboxylic acid or its anhydride with a low molecular weight polyepoxide. Examples of such polyepoxides are liquid diglycidylethers of 2,2-bis (4-hydroxyphenyl)-propane, diglycidylphthalate, diglycidyladipate, diglycidyltetrahydrophthalate, diglycidylhexahydrophthalate, diglycidylmaleate and the 3,4-epoxycyclohexylmethyl ester of 3,4-epoxycyclohexane carboxylic acid.

Mixtures of solid polyepoxides can likewise be used, e.g. a mixture of a polyepoxide, the melting point of which lies between 120° and 160° C., and a polyepoxide with a melting point between 60° and 80° C. (melting point is determined by the mecury method of Durrans). Suitable mixtures contain between 30 and 50 wt.% of a solid polyglycidyl ether of 2,2-bis (4-hydroxyphenyl)-propane with an epoxy-equivalent weight between 1650 and 2050 and a melting point of 120° to 160° C. and between 50 and 70 wt.% of a solid polyglycidyl polyether of 2,2-bis (4-hydroxyphenyl)-propane with an epoxy-equivalent weight between 450 and 525 and a melting point of 60° to 80° C.

The polyisocyanates of the invention, blocked with cyclic amidines of the described general formula, can be produced by conversion at temperatures of 0°–150° C., preferably 80°–120° C., where the polyisocyantes and the cyclic amidines are introduced in such quantities that there is 0.5–1.1, preferably 0.8–1.0 Mol of cylic amidine to one isocyanate group. The reaction temperature, however, should lie below the cleavage temperature of the hardener.

The conversion can be carried out in solution, in the melt or in an excess of polyisocyanate.

As starting compounds, which can be used for blocking with the cyclic amidines, there are suited, for example, polyisocyantes, especially diisocyanates such as aliphatic, cycloaliphatic, araliphatic, i.e., aryl-substituted aliphatic, and/or aromatic diisocyanates as described, for example, in Houben-Weyl, Methoden des organischen Chemie, vol 14/2, pp. 61–70 and in the article by W. Siefken in Justus Liebig's Annalen des Chemie 562, 75–136, like 1,2-ethylenediisocyanate, 1,4-tetramethylenediisocyanate, 1,6-hexamethylenediisocyanate, 2,2,4- or 2,4,4-trimethyl-1,6-hexamethylenediisocyanate (TMDI), 1,12-dodecanediisocyanate, ω, ω'-diisocyanatodipropylether, cyclobutane-1,3-diisocyanate, cyclohexane-1,3- and 1,4-diisocyanate, 3-isocyanatomethyl-3,5,5-trimethylcyclohexylisocyanate, which is also called isophorondiisocyanate and abbreviated as IPDI, decahydro-8-methyl-(1,4-methano-naphthalene-2 (or 3),5-ylenedimethylenediisocyanate, hexahydro-4,7-methano-indan-1 (or 2),5 (or 6)-ylenedimethylenediisocyanate, hexahydro-4-7-methano-indan-1 (or 3),5 (or 6)-ylenediisocyanate, hexahydro-1,3- or 1-4-phenylene diisocyanate, 2,4- and 2,6-hexahydrotoluylene diisocyanate, perhydro-2,4'- and/or -4,4'-diphenyl-methanediisocyanate, ω,ω'-diisocyanate-1,4-diethylbenzene, 1,4-phenylene diisocyanate, 4,4'diisocyanato-diphenyl, 4,4'-diisocyanato-3,3'-dichloro-diphenyl, 4,4'-diisocyanato-3,3'-dimethoxydiphenyl, 4,4'-diisocyanato-3,3'-dimethyl-diphenyl, 4,4'-diisocyanato-3,3'-diphenyl-diphenyl, 4,4'-diisocyanato-diphenylmethane, naphthalene-1,5-diisocyanate, toluylene diisocyanate, toluylene-2,4- or 2,6-diisocyanate, N,N'-(4,4'-dimethyl-3,3'-diisocyanatodipheny)-uretdione,m-xylylenediisocyanate, and also the triisocyanates like 2,4,4'-triisocyanato-diphenylether, 4,4',4"-triisocyanate-triphenylmethane, tris (4-isocyanatophenyl)-thio-phosphate, as well as any mixtures of these compounds. Other suitable isocyanates are described in the cited article in the Annalen on p. 122 ff.

Particularly recommended as a rule are the technically easily obtainable aliphatic, cycloaliphatic or aromatic diisocyanates and especially 3-isocyanatomethyl-3,5,5-trimethyl-cyclohexyl isocyanate and 2,4-toluylene diisocyanate as well as their isomeric mixtures.

Besides the monomeric polyisocyanates there can obviously also be used as starting materials for blocking with the imidazolines described in detail below, the dimer and trimer forms of the polyisocyanates, such as uretdiones and isocyanurates, preparable by known methods.

Under polyisocyanates in the sense of the present invention are also to be understood such as have been subjected before blocking with the imidazolines to a conversion for molecular enlargement with the so-called chain extension agents common in isocyanate chemistry such as water, polyols, polyamines, etc., where the bi- or tri-functioned chain-lengthening agents, such, that is, with groups that can react with isocyanate groups, like hydroxyl and/or amino groups, are used in such quantities that the resulting new isocyanate carries on the average at least two isocyanate groups. In using water as chain-lengthening agent the result is polyisocyanates with one or more ureido groupings.

Suitable polyols are, for example, diols and triols such as ethylene glycol, propylene glycols like 1,2- and 1,3-propanediol, 2,2-dimethylpropanediol-(1,3), butanediols like butanediol-(1,4), hexanediols, e.g.hexanediol-(1,6), 2,2,4-trimethylhexanediol-(1,6), 2,4,4-trimethylhexanediol-(1,6), heptanediol-(1,7), octadecen-9,10-diol-(1,12), thiodiglycol, octadecanediol-(1,18), 2,4-dimethyl-2-propylheptanediol-(1,3), butene- or butynediol-(1,4), diethylene glycol, triethylene glycol, trans- and cis-1,4-cyclohexanedimethanol, 1,4-cyclohexanediol, glycerin, hexanetriol-(1,2,6), 1,1,1-trimethylolpropane, 1,1,1-trimethylolethane etc. Mixtures of the named compounds can also be used.

Of the polyamines suitable for the chain-lengthening or molecular enlargement there should be mentioned, for example, ethylenediamine-1,2, propylenediamine-1,2 and -1,3-butylenediamine-1,2, -1,3 and -1,4 as well as the hexamethylenediamines which can be one or more $C_1$–$C_4$ alkyl radicals, like 2,2,4- or 2,4,4-trimethylhexamethylenediamine-1,6 etc., and 3-aminomethyl-3,5,5-trimethylcyclohexylamine, which is also denoted by IPD.

Suitable imidazoline derivatives in the sense of the present invention, which correspond to the earlier described general formula, are for example those with possibly aryl-substitued alkyl groups, with possibly alkyl-substituted aryl groups, like 2-methylimidazoline, 2,4-dimethylimidazoline, 2-methyl-4-(n-butyl)-imidazoline, 2-ethylimidazoline, 2-ethyl-4-methylimidazoline, 2-benzyl-imidazoline, 2-phenyl-imidazoline, 2-phenyl-4-methylimidazoline, 2-(o-tolyl)-imidazoline, 2-(p-tolyl)-imidazoline etc. Mixtures of the imidazoline derivatives of the invention can also be employed. This is particularly advantageous when blocked isocyanates with low melting points or ranges are needed.

The imidazoline derivatives of the invention can be produced by known methods from possibly substituted diamines and aliphatic or aromatic mononitriles in the presence of elemental sulfur or sulfuryl chloride as catalyst.

The blocking, as already mentioned, can also be carried out in solvents. Only those are useable for this purpose which do not react with the polyisocyanates, e.g. ketones like acetone, methylethyl ketone, methylisobutyl ketone, cyclopentanone, cyclohexanone etc.; aromatics like benzene, toluene, xylene, chlorobenzene, nitrobenzene etc.; cyclic ethers like tetrahydrofuran, dioxane etc.; esters like methyl acetate, n-butyl acetate etc.; aliphatic chlorohydrocarbons like chloroform, carbon tetrachloride etc.; as well as aprotic solvents like dimethylformamide, dimethylacetamide, dimethylsulfoxide etc.

If the blocking agent is introduced in the ratio of $\geq$ to the number of isocyanate groups, the reaction mixtures are held at the given temperatures long enough for the NCO content to decrease to less than 0.2%, or until a constant NCO value is reached.

Likewise useable in the invention are those blocked polyisocyanates which can be obtained by subsequent conversion of a group of blocked polyisocyanates, viz. those in which cyclic amidines have been introduced in substoichiometric amounts, i.e. the ratio of cyclic amidine to isocyanate groups was <1:1, with the same chain-lengthening agents described earlier as means for molecular enlargement. The conversion occurs likewise at temperatures in the range of 0°–150° C., preferably 80°–120° C., but below the deblocking temperature of the blocked polyisocyanate. By means of these blocked polyisocyanates, coating media can be produced which satisfy practical requirements within very wide limits. This variant method is of particular interest for polyisocyanates with differently reactive NCO groups.

Thus by changing the sequence adduct formation/blocking, blocked polyisocyanates with different reactivity, melting range and structure can be obtained.

By blocking of diisocyanates and divalent chain-lengthening agents, compounds are obtained which can be described by the following general formula.

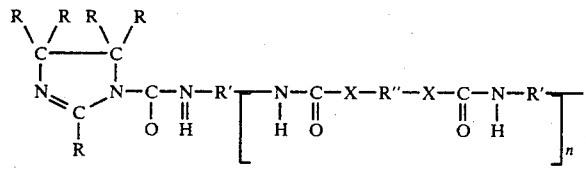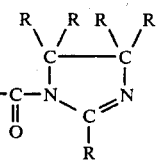

In this formula n is 0 or 1, X is O, S or an NH group, the R's are the same or different radicals selected from the group of hydrogen, alkyl, cycloalkyl, aralkyl and aryl radicals, R' is an alkylene, cycloalkylene or arylene radical and R'' is a saturated or unsaturated alkylene group with 2–18 C atoms possibly substituted by one or more alkyl radicals, where more than one group can also jointly form a component of a cycloaliphatic ring, and possibly containing one or more oxygen or sulfur atoms in the hydrocarbon chain, or it is a cycloalkylene radical.

The amount of polyisocyanate blocked with a cyclic amidine and employed as hardening agent can be varied within remarkably wide limits. Excellent results are obtained with just 2–15 parts by weight, preferably 6–12 parts by wt. of hardening agent, with respect to the amount of solid 1,2-epoxide compound used.

So-called vehicles are introduced during preparation for improvement of the flow characteristics of the lacquers. These can be chemical compounds or their mixtures of very different chemical type, e.g. polymer or monomer compounds, acetals such as:
polyvinyl formal, polyvinyl acetal, polyvinyl butyral, polyvinyl acetobutyral or
di-2-ethylhexyl-i-butyraldehyde-acetal,
di-2-ethylhexyl-n-butyraldehyde-acetal,
diethyl-2-ethylhexanol-acetal,
di-n-butyl-2-ethyl-hexanol-acetal,
di-i-butyl-2-ethylhexanol-acetal,
di-2-ethylhexyl-acetaldehyde-acetal etc.
ethers, such as the polymeric polyethylene and polypropylene glycols, mixed polymerizates of n-butyl acrylate and vinyl isobutyl ether, ketone-aldehyde condensation resins, solid silicone resins or even mixtures of zinc soaps of fatty acids and aromatic carboxylic acids etc. Such vehicles can be contained in the formulations in quantities of 0.2–5.0 wt.% with respect to the total quantity of the powder lacquer.

The other ingredients of the heat-hardenable powder-lacquer mixture, like pigments, dyes, fillers, thixotropic agents, UV and oxidation stabilizers and the like can fluctuate over a wide range with respect to the amount of 1,2-epoxide compounds.

Further object of the invention is the production of the powdery coating medium in which one mixes the solid 1,2-epoxide compounds and the hardening agent, possibly after introduction of the mentioned lacquer additives, in the given proportions and extrudes the mixture at least 30° C. below the splitting temperature of the hardening agent, then grinds the product to a grain size smaller than 0.25 mm, preferably <100μ, and a grain size maximum between 20 and 60μ, preferably between 30 and 50μ, and possibly removes the coarser fraction by sifting.

The application of the powder lacquer to the objects to be coated can be carried out by known methods, e.g. electrostatic powder spraying, vortex sintering, electrostatic vortex sintering etc.

After application of the powder lacquers by one of the above methods to the object to be lacquered, the hardening is carried out by heating to temperatures above the cleavage temperature of the hardening agent, i.e. 130°–200° C., preferably 140°–180° C. The resulting coating possesses the described advantages.

All substrates, such as metal surfaces, glass surfaces etc., which can withstand the given hardening temperatures without damage to their mechanical properties are suitable for coating with the powder lacquers of the invention.

The powdery coating media of the invention and their use will be illustrated by means of the following examples:

EXAMPLE 1

1a. Blocked polyisocyanate:
Into a mixture of 222 parts by wt. of isophoronediisocyanate (IPDI) and 300 parts by wt. of water-free acetone were slowly dropped at room temperature 292 parts by wt. of 2-phenylimidazoline, which had been dissolved in 500 parts by wt. of water-free acetone. When all the 2-phenylimidazoline was added heating was maintained at a temperature of 50° C. for one hour. The acetone was then distilled off. The last traces of acetone were removed by drying the reaction product at 60° C. in a vacuum drying chamber. The 2-phenylimidazoline-blocked IPDI is a white powder with a melting range of 98°–106° C., a softening point (DTA) of 63°–80° C. and a content of free isocyanate of <0.2 wt.%.

1b. 1,2-epoxide compound:
In this and all other examples a 1,2-epoxide compound on the base of an adduct of 2,2-bis (4-hydroxyphenyl)-propane (Dian) and epichlorohydrin was used which had undergone an HCl cleavage and then been reacted with more Dian and which, according to the manufacturer, had an epoxy-equivalent weight of 900–1000, an epoxy value of 0.10–0.11, a hydroxyl value of 0.34 and a melting range of 96°–104° C.

1c. Pigmented powdery coating medium:
The ground products 1,2-epoxide compound, 2-phenylimidazoline-blocked IPDI and masterbatch vehicle were thoroughly mixed with the white pigment (TiO$_2$) in an edge mill and then homogenized in an extruder at 90°–100° C. After cooling, the extrudate was broken up and ground in a rod mill to a grain size <100μ. The resultant powder was applied with an electrostatic powder sprayer at 60 kv to degreased sheet iron and baked on in a circulating drying chamber.

The epoxide of Example 1b was converted with varying amounts of the blocked isocyanate component of Example 1a.

Composition of the powdery coating media:

|  | C$_1$ | C$_2$ | C$_3$ |
|---|---|---|---|
| Epoxide of 1b | 1297.5 | 1261.5 | 1227.5 parts by wt. |
| Masterbatch plasticizer* | 125.0 | 125.0 | 125.0 parts by wt. |
| Blocked IPDI of 1a | 77.5 | 113.5 | 147.5 parts by wt. |
| White pigment (TiO$_2$) | 1000.0 | 1000.0 | 1000.0 parts by wt. |

*10 wt. % of a vehicle based on polyacrylates, commercially available under the name Modaflow ®, in 1,2-epoxide compounds of 1b.

The pigmented powder lacquer of 1c, was hardened between 180° and 200° C.

The mechanical characteristics of the resultant lacquer film are given in the following table:

| Bake-on Conditions | Mechanical Data | | | | | | |
|---|---|---|---|---|---|---|---|
| Time/Temp | FT | HK | HB | EP | GT | Imp. rev. | GG 60° |
| 15′/200° C. | 60–95 | 193 | 100 | 5–7 | 0 | 10 | 92 |
| 20′/200° C. | 80–120 | 205 | 100 | 6–7 | 0 | 20 | 93 |
| 25′/200° C. | 75–95 | 200 | 111 | 7–8 | 0 | >82 | 90 |
| 30′/190° C. | 75–105 | 214 | 91 | 7.5–8.5 | 0 | >82 | 89 |
| 35′/180° C. | 80–95 | 211 | 100 | 7.5–8 | 0 | >82 | 94 |

The abbreviations in this and the following tables are:
FT=film thickness (in μ)
HK=Konig hardness (in sec) (according to DIN 53 157)
HB=Buchholz hardness (according to DIN 53 153)
EP=Erichsen penetration (in mm) (according to 53 156)
GT=grid-cut test (according to DIN 53 151)
GG 60°=Gardner gloss measurement (according to ASTM-D-523)
Imp. rev.=impact reverse (in inch.lb)

The pigmented coating powder of 1C$_2$ was hardened between 150° C. and 200° C. The results obtained are in the table below:

| Bake-on Conditions | Mechanical Data | | | | | | |
|---|---|---|---|---|---|---|---|
| Time/Temp. | FT | HK | HB | EP | GT | Imp rev. | GG 60° |
| 8′/200° C. | 60 | 175 | 83 | 7.5–8.5 | 0 | >82 | 90 |
| 10′/200° C. | 50 | 181 | 91 | 8–8.9 | 0 | >82 | 91 |
| 12′/200° C. | 40–65 | 177 | 111 | 8–8.5 | 0 | >82 | 94 |
| 15′/200° C. | 40–60 | 185 | 100 | 8–8.5 | 0 | >82 | 93 |
| 8′/190° C. | 60–70 | 177 | 111 | 7–8 | 0 | >82 | 95 |
| 10′/190° C. | 50–60 | 178 | 100 | 7.5–8.5 | 0 | >82 | 92 |
| 12′/190° C. | 50–65 | 183 | 100 | 8–8.5 | 0 | >82 | 93 |
| 14′/190° C. | 60–80 | 178 | 100 | 8.4 | 0 | >82 | 92 |
| 20′/190° C. | 50–70 | 177 | 100 | 7.9–8.5 | 0 | >82 | 93 |
| 12′/180° C. | 70–80 | 192 | 100 | 7.5–8 | 0 | >82 | 93 |
| 14′/180° C. | 70–80 | 191 | 100 | 7.5–8 | 0 | >82 | 94 |
| 16′/180° C. | 60–80 | 189 | 100 | 7.5–8 | 0 | >82 | 95 |
| 20′/180° C. | 70–90 | 190 | 100 | 7.6–8 | 0 | >82 | 93 |
| 12′/170° C. | 90 | 198 | 111 | 8.2 | 0 | >82 | 95 |
| 14′/170° C. | 70 | 193 | 100 | 7.7 | 0 | >82 | 93 |
| 16′/170° C. | 90 | 197 | 100 | 8.1 | 0 | >82 | 93 |
| 25′/160° C. | 70–90 | 192 | 91 | 7.5–8 | 0 | 60 | 90 |
| 40′/150° C. | 60–90 | 201 | 91 | 7–7.5 | 0 | >82 | 93 |

The lacquer film, baked on at 180° C. within 12′, was subjected to the boiling water test and showed no effects after 24 hr.; abrasion was measured with the Taber abrader (1000 rpm, 1000 g, wheel type C517) to be 35–40 mg. The weight loss was significantly less than in films made with ε-caprolactam-blocked diisocyanates, since the 2-phenylimidazoline used as blocking agent reacted even with the 1,2-epoxide groups.

The pigmented coating powder of 1C$_3$ was baked on between 150° C. and 200° C. The results obtained are presented in the following table.

This lacquer film, too, was hardened at 180° C. within 12′ and showed excellent resistance to boiling water, little abrasion and small weight loss.

| Bake-on Conditions | Mechanical Data | | | | | | |
|---|---|---|---|---|---|---|---|
| Time/Temp. | FT | HK | HB | EP | GT | Imp rev. | GG 60° |
| 4′/200° C. | 40–60 | 171 | 100 | 6.8 | 0 | >82 | 90 |
| 6′/200° C. | 70–80 | 173 | 125 | 7.4 | 0 | >82 | 90 |
| 8′/200° C. | 55 | 176 | 111 | 7.7 | 0 | >82 | 91 |
| 10′/200° C. | 60 | 173 | 100 | 8.2 | 0 | >82 | 90 |
| 12′/200° C. | 50–60 | 170 | 111 | 7.5 | 0 | >82 | 91 |
| 6′/190° C. | 60–80 | 181 | 83 | 6.9 | 0 | >82 | 92 |
| 8′/190° C. | 50–70 | 178 | 100 | 7.8 | 0 | >82 | 90 |
| 10′/190° C. | 55–80 | 179 | 100 | 7.6 | 0 | >82 | 89 |
| 12′/190° C. | 60–70 | 176 | 100 | 7.0 | 0 | >82 | 91 |
| 14′/190° C. | 60 | 170 | 111 | 7.6 | 0 | >82 | 91 |
| 8′/180° C. | 60–80 | 183 | 83 | 6.8 | 0 | >82 | 93 |
| 10′/180° C. | 50–70 | 185 | 91 | 7.1 | 0 | >82 | 92 |
| 12′/180° C. | 65–70 | 176 | 91 | 7.1 | 0 | >82 | 93 |
| 14′/180° C. | 70–80 | 172 | 91 | 7.6 | 0 | >82 | 91 |
| 10′/170° C. | 65 | 189 | 125 | 7.5 | 0 | >82 | 95 |
| 12′/170° C. | 45 | 180 | 100 | 8.1 | 0 | >82 | 90 |
| 14′/170° C. | 60 | 177 | 100 | 7.8 | 0 | >82 | 89 |
| 14′/160° C. | 70–80 | 197 | 83 | 7.9 | 0 | >82 | 89 |
| 16′/160° C. | 55 | 182 | 83 | 7.1 | 0 | >82 | 93 |
| 18′/160° C. | 90–100 | 176 | 83 | 7.1 | 0 | >82 | 92 |
| 16′/150° C. | 60 | 175 | 100 | 6.7 | 0 | >82 | 90 |
| 18′/150° C. | 60 | 186 | 91 | 6.0 | 0 | >82 | 95 |

EXAMPLE 2

2a. Production of the diethylene glycol adduct of IPDI:
To 444 parts by wt. of IPDI were added at 80° C. slowly with thorough stirring, 106 parts by wt. of diethylene glycol. After all the diethylene glycol had been added heating was continued for 2 hr. at 80° C. The NCO content of the IPDI/diethylene glycol mixture was then 15.1%.

2b. Blocked polyisocyanate:
To 550 parts by wt. of the adduct made according to 2a from 2 mols of IPDI and 1 mol of diethylene glycol, 292 parts by wt. of 2-phenylimidazoline were added little by little at 120° C. so that the temperature did not rise above 125° C. When all the 2-phenylimidazoline had been added, the reaction mixture was heated for another hour at 120° C. The reaction product is a pale yellow powder with a melting range of 103°–110° C., a softening point (DTA) of 70°–90° C. and a free NCO content of 0.2%.

2c. 1,2-epoxide compound:

The epoxide described in Example 16 was used.

2d. Pigmented powdery coating medium:

As in Example 1c two pigmented powder lacquers were made with the following recipes, applied and baked on:

|  | $d_1$ | $d_2$ |  |
|---|---|---|---|
| Epoxide as in 1b | 1252 | 1198 | parts by wt. |
| Masterbatch vehicle as in 1c | 125 | 125 | parts by wt. |
| White pigment (TiO$_2$) | 1000 | 1000 | parts by wt. |
| Blocked IPDI as in 2b | 123 | 177 | parts by wt. |

The pigmented coating powder of Example 2d, was hardened between 180° C. and 200° C. The properties of the lacquer films obtained are shown in the following table:

| Bake-on Conditions Time/Temp. | Mechanical Data |  |  |  |  |  |  |
|---|---|---|---|---|---|---|---|
|  | FT | HK | HB | EP | GT | Imp rev. | GG 60° |
| 18'/200° C. | 60–90 | 201 | 91 | 6.3 | 0 | 60 | 93 |
| 20'/200° C. | 90–100 | 203 | 91 | 7.4–7.9 | 0 | >82 | 91 |
| 25'/200° C. | 90–100 | 205 | 91 | 7.7–8.4 | 0 | >82 | 94 |
| 20'/190° C. | 60–90 | 207 | 83 | 5.5–7.5 | 0 | 30 | 91 |
| 25'/190° C. | 55–65 | 212 | 91 | 6–8.1 | 0 | 60 | 94 |
| 30'/190° C. | 70–90 | 202 | 100 | 7.6–8.6 | 0 | >82 | 92 |
| 30'/180° C. | 65–90 | 201 | 83 | 5.5–6 | 0 | 40 | 91 |
| 35'/180° C. | 110 | 205 | 91 | 6–7.1 | 0 | 70 | 93 |

The pigmented coating powder of Example 2d$_2$ was hardened between 160° C. and 200° C. and exhibited significantly improved elasticity, produced by a 50% increase in the crosslinking component. The mechanical properties determined for the lacquer films are given in the following table.

| Bake-on Conditions Time/Temp. | Mechanical Data |  |  |  |  |  |  |
|---|---|---|---|---|---|---|---|
|  | FT | HK | HB | EP | GT | Imp rev. | GG 60° |
| 10'/200° C. | 60–80 | 180 | 83 | 5.6–6.0 | 0 | 50 | 82 |
| 12'/200° C. | 60–70 | 187 | 83 | 5.6–6.3 | 0 | >82 | 79 |
| 15'/200° C. | 50–75 | 182 | 91 | 5.7–6.5 | 0 | >82 | 83 |
| 20'/200° C. | 60–90 | 180 | 91 | 5.7–6.8 | 0 | >82 | 84 |
| 12'/190° C. | 60–75 | 179 | 83 | 4.9–5.5 | 0 | 70 | 83 |
| 14'/190° C. | 65 | 182 | 83 | 5.0–5.6 | 0 | >82 | 8 |
| 20'/190° C. | 50–70 | 179 | 83 | 5.5–5.8 | 0 | >82 | 82 |
| 25'/190° C. | 60–70 | 185 | 91 | 5.5–6.1 | 0 | >82 | 84 |
| 14'/180° C. | 70–80 | 184 | 100 | 5.6–6.1 | 0 | 60 | 81 |
| 16'/180° C. | 75–90 | 182 | 91 | 6.5–6.8 | 0 | >82 | 83 |
| 20'/180° C. | 65 | 180 | 100 | 6.8–7.0 | 0 | >82 | 82 |
| 25'/180° C. | 70–80 | 183 | 100 | 6.3–6.9 | 0 | >82 | 80 |
| 18'/170° C. | 50–60 | 181 | 100 | 6.1–6.5 | 0 | >82 | 81 |
| 20'/170° C. | 70–90 | 183 | 91 | 6.7–7.0 | 0 | >82 | 84 |
| 25'/160° C. | 40–70 | 183 | 100 | 4.5–5.8 | 0 | >82 | 83 |
| 35'/150° C. | 80–110 | 181 | 100 | 4.5–5.5 | 0 | 70 | 82 |

EXAMPLE 3

3a. Blocked polyisocyanate:

To a melt of 320 parts by wt. of a 2-phenyl-4-methylimidazoline 222 parts by wt. of IPDI were added drop by drop so that the temperature in the reaction flask did not rise above 120° C. For completion of the reaction the mixture was held at 120° C. for 3 hr. These conditions suffice for an almost total conversion. The reaction product is a white crystalline powder with a melting range of 95°–103° C., a softening point (DTA) of 65°–85° C. and a free NCO content <0.1%.

3b. 1,2-epoxide compound:

The epoxide described in Example 1b was used.

3c. Pigmented powdery coating medium:

As in Example 1c two pigmented powder lacquers were prepared with the following recipes, applied and baked on.

|  | $c_1$ | $c_2$ |  |
|---|---|---|---|
| Epoxide as in 1b | 1272.5 | 1226.4 | parts by wt. |
| Masterbatch vehicle as in 1c | 125.0 | 125.0 | parts by wt. |
| Blocked IPDI as in 3a | 102.5 | 148.6 | parts by wt. |
| White pigment (TiO$_2$) | 1000.0 | 1000.0 | parts by wt. |

The pigmented coating powder of Example 3c, was baked on between 170° C. and 200° C. The determined mechanical properties of the lacquer films are presented in the following table.

| Bake-on Conditions Time/Temp. | Mechanical Data |  |  |  |  |  |  |
|---|---|---|---|---|---|---|---|
|  | FT | HK | HB | EP | GT | Imp rev. | GG 60° |
| 12'/200° C. | 50–110 | 187 | 100 | 6.7–7.2 | 0 | 70 | 92 |
| 14'/200° C. | 60–75 | 183 | 100 | 7.2–7.6 | 0 | >82 | 94 |
| 16'/200° C. | 70–90 | 186 | 100 | 7.1–7.9 | 0 | >82 | 93 |
| 14'/190° C. | 105–115 | 181 | 100 | 5.9–7.2 | 0 | 50 | 90 |
| 16'/190° C. | 70–85 | 183 | 100 | 6.3–7.5 | 0 | >82 | 93 |
| 18'/190° C. | 55–90 | 184 | 100 | 6.5–7.3 | 0 | >82 | 92 |
| 16'/180° C. | 80–115 | 188 | 100 | 5.1–5.6 | 0 | 40 | 91 |
| 18'/180° C. | 70–95 | 183 | 100 | 5.5–6.3 | 0 | 70 | 90 |
| 20'/180° C. | 60–90 | 182 | 100 | 5.9–6.9 | 0 | >82 | 93 |
| 20'/170° C. | 70–95 | 183 | 100 | 5.1–5.9 | 0 | 50 | 92 |
| 25'/170° C. | 85–110 | 181 | 91 | 6.0–6.5 | 0 | >82 | 90 |

The pigmented lacquer of 3c$_2$, which was baked on between 170° and 200° C., shows significantly improved elasticity, produced by an approximately 50% increase in the crosslinking component.

| Bake-on Conditions Time/Temp. | Mechanical Data |  |  |  |  |  |  |
|---|---|---|---|---|---|---|---|
|  | FT | HK | HB | EP | GT | Imp rev. | GG 60° |
| 10'/200° C. | 50–90 | 186 | 100 | 6.7–7.5 | 0 | 80 | 92 |
| 12'/200° C. | 67–95 | 185 | 91 | 6.9–7.7 | 0 | >82 | 91 |
| 14'/200° C. | 70–100 | 187 | 100 | 6.8–7.9 | 0 | >82 | 93 |
| 16'/200° C. | 65–110 | 185 | 100 | 6.7–8.0 | 0 | >82 | 91 |
| 12'/190° C. | 60–80 | 184 | 91 | 6.5–7.3 | 0 | >82 | 93 |
| 14'/190° C. | 70–80 | 182 | 100 | 6.7–7.5 | 0 | >82 | 91 |
| 16'/190° C. | 55–95 | 187 | 100 | 6.8–7.6 | 0 | >82 | 94 |
| 18'/190° C. | 75–105 | 183 | 100 | 6.5–7.8 | 0 | >82 | 91 |
| 14'/180° C. | 60–70 | 181 | 100 | 6.1–7.2 | 0 | 80 | 91 |
| 16'/180° C. | 70–90 | 187 | 100 | 6.3–7.4 | 0 | >82 | 95 |
| 18'/180° C. | 50–80 | 185 | 100 | 6.2–7.6 | 0 | >82 | 93 |
| 18'/170° C. | 60–100 | 184 | 91 | 6.0–6.9 | 0 | 70 | 90 |
| 20'/170° C. | 70–90 | 188 | 100 | 6.4–7.3 | 0 | >82 | 93 |

EXAMPLE 4

4a. Blocked Polyisocyanate:

To 550 parts by weight of the IPDI/diethylene glycol adduct at 100° C. were added 320 parts by wt. of 2-phenyl-4-methylimidazole in such a way that the temperature of the reaction mixture did not exceed 100° C. For completion of the reaction the mixture was held at 110° C. for another 2 hours. The reaction product is a white powder with a melting range of 95°–100° C. and a softening point (DTA) of 65°–95° C. No NCO could be detected any longer in the reaction product.

4b. 1,2-epoxide compound:

The epoxide described in Example 1b was used.

4c. Pigmented powdery coating medium:

As in Example 1c a pigmented powder lacquer was prepared, applied and baked on.

Epoxide as in 1d—1217.5 parts by wt.
Masterbatch vehicle as in 1c—125.0 parts by wt.
Blocked IPDI as in 4a—157.5 parts by wt.
White pigment ($TiO_2$)—1000.0 parts by wt.

This pigmented powder lacquer was then baked on between 170° C. and 200° C. The mechanical values for the lacquer films obtained are given in the following table:

| Bake-on Conditions Time/Temp. | Mechanical Data ||||||
|---|---|---|---|---|---|---|
|  | FT | HK | HB | EP | GT | Imp rev. | GG 60° C. |
| 12'/200° C. | 50–80 | 181 | 100 | 7.5–8.5 | 0 | 70 | 96 |
| 14'/200° C. | 80–115 | 179 | 125 | 7.7–8.5 | 0 | >82 | 99 |
| 16'/200° C. | 70–105 | 180 | 111 | 7.6–8.7 | 0 | >82 | 94 |
| 14'/190° C. | 75–80 | 178 | 100 | 8.4–8.6 | 0 | 70 | 95 |
| 16'/190° C. | 65–90 | 179 | 111 | 8.4–8.7 | 0 | >82 | 97 |
| 18'/190° C. | 60–100 | 181 | 100 | 8.3–8.8 | 0 | >82 | 96 |
| 16'/180° C. | 60–105 | 177 | 100 | 8.5–8.8 | 0 | 70 | 100 |
| 18'/180° C. | 60–95 | 179 | 111 | 8.4–8.0 | 0 | >82 | 99 |
| 20'/180° C. | 70–100 | 178 | 100 | 8.3–8.8 | 0 | >82 | 97 |
| 20'/170° C. | 75–80 | 183 | 100 | 7.8–8.3 | 0 | >82 | 98 |
| 25'/170° C. | 70–90 | 181 | 111 | 7.8–8.6 | 0 | >82 | 99 |

By increasing the crosslinking component one obtains also with 2-phenyl-4-methylimidazoline-blocked IPDI-diethylene glycol adduct a higher elasticity with simultaneous reduction in the hardening temperatures or times.

EXAMPLE 5

5a. Blocked polyisocyanate:

To 222 parts by wt. of IPDI at 80° C. 196 parts by wt. of 2,4-dimethylimidazoline were added drop wise so that the temperature did not go above 90° C. When all the 2,4-dimethylimidazoline had been added, the formulation was held at 100° C. for another hour. The reaction product is a colorless powder with a melting range of 104°–110° C. and a softening point (DTA) of 82°–95° C. No NCO could any longer be detected in the reaction product.

5b. Epoxide compound:

The epoxide described in Example 16 was used.

5c. Pigmented powdery coating medium:

As in Example 1c pigmented powder lacquers were prepared, applied and baked on.

|  | $c_1$ | $c_2$ |  |
|---|---|---|---|
| Epoxide as in 1b | 1310.9 | 1281.6 | parts by wt. |
| Masterbatch vehicle as in 1c | 125.0 | 125.0 | parts by wt. |
| Blocked IPDI as in 5a | 64.1 | 93.4 | parts by wt. |
| White pigment ($TiO_2$) | 1000.0 | 1000.0 | parts by wt. |

The pigmented powder lacquer of 5c, was baked on between 150° C. and 200° C. The values obtained for the lacquer films are given in the table below.

| Bake-on Conditions Time/Temp. | Mechanical Data ||||||
|---|---|---|---|---|---|---|
|  | FT | HK | HB | EP | GT | Imp rev. | GG 60° |
| 6'/200° C. | 60–70 | 183 | 91 | 5.5–6.3 | 0 | 80 | 86 |
| 8'/200° C. | 50–80 | 179 | 100 | 5.8–6.5 | 0 | >82 | 85 |
| 10'/200° C. | 60–90 | 184 | 100 | 5.9–6.7 | 0 | >82 | 88 |
| 6'/190° C. | 65–85 | 181 | 100 | 5.3–6.0 | 0 | >82 | 83 |
| 10'/190° C. | 70–90 | 180 | 100 | 5.7–6.4 | 0 | >82 | 87 |
| 12'/190° C. | 60–100 | 184 | 111 | 5.5–6.5 | 0 | >82 | 85 |
| 10'/180° C. | 70–100 | 185 | 91 | 5.4–6.0 | 0 | >82 | 81 |
| 12'/180° C. | 80–110 | 181 | 100 | 5.7–6.3 | 0 | >82 | 86 |
| 12'/170° C. | 60–85 | 182 | 100 | 5.3–5.8 | 0 | >82 | 82 |
| 14'/170° C. | 70–100 | 180 | 91 | 5.7–6.3 | 0 | >82 | 88 |
| 16'/170° C. | 50–90 | 187 | 100 | 5.9–6.6 | 0 | >82 | 83 |
| 18'/160° C. | 45–75 | 180 | 91 | 5.2–6.0 | 0 | >82 | 87 |
| 20'/160° C. | 60–80 | 179 | 100 | 5.5–6.1 | 0 | >82 | 88 |
| 20'/150° C. | 70–90 | 183 | 100 | 5.3–6.1 | 0 | >82 | 81 |
| 25'/150° C. | 80–100 | 187 | 91 | 5.5–6.4 | 0 | >82 | 85 |

The pigmented powder lacquer of Example 5c$_2$, which was baked on between 130° C. and 200° C., exhibited a significantly improved elasticity, produced by a 50% increase in the crosslinking component. In addition the bake-on times could be shortened or the temperatures lowered. The measured mechanical properties of the lacquer films appear in the following table.

| Bake-on Conditions Time/Temp. | Mechanical Data ||||||
|---|---|---|---|---|---|---|
|  | FT | HK | HB | EP | GT | Imp rev. | GG 60° |
| 4'/200° C. | 60–70 | 186 | 91 | 4.2–4.9 | 0 | >82 | 86 |
| 6'/200° C. | 55–70 | 179 | 100 | 5.5–6.3 | 0 | >82 | 86 |
| 8'/200° C. | 50–75 | 187 | 111 | 6.4–6.9 | 0 | >82 | 87 |
| 4'/190° C. | 40–55 | 185 | 83 | 4.0–4.4 | 0 | 70 | 84 |
| 6'/190° C. | 40–50 | 187 | 100 | 5.5–6.0 | 0 | >82 | 81 |
| 8'/190° C. | 56–70 | 186 | 91 | 6.2–6.7 | 0 | >82 | 85 |
| '/190° C. | 40–55 | 185 | 100 | 6.0–6.0 | 0 | >82 | 87 |
| 6'/180° C. | 50–65 | 176 | 91 | 4.9–5.9 | 0 | 80 | 80 |
| 8'/180° C. | 30–40 | 180 | 87 | 5.5–6.6 | 0 | >82 | 81 |
| 10'/180° C. | 40–55 | 183 | 100 | 6.0–6.8 | 0 | >82 | 80 |
| 6'/170° C. | 70–95 | 180 | 100 | 6.4–6.9 | 0 | >82 | 84 |
| 8'/170° C. | 85–90 | 177 | 100 | 7.6–7.7 | 0 | >82 | 81 |
| 10'/170° C. | 115–125 | 179 | 100 | 7.1–7.3 | 0 | >82 | 85 |
| 8'/160° C. | 60–75 | 175 | 100 | 7.2–7.6 | 0 | >82 | 79 |
| 10'/160° C. | 60–80 | 173 | 111 | 8.3–8.8 | 0 | >82 | 81 |
| 12'/160° C. | 60–65 | 174 | 125 | 7.1–8.0 | 0 | >82 | 86 |
| 14'/150° C. | 60–70 | 180 | 100 | 6.4–6.9 | 0 | >82 | 82 |
| 16'/150° C. | 80–100 | 179 | 100 | 6.5–7.0 | 0 | >82 | 81 |
| 16'/140° C. | 60–80 | 175 | 91 | 4.4–5.4 | 0 | 70 | 83 |
| 18'/140° C. | 70–90 | 178 | 91 | 5.0–5.3 | 0 | >82 | 87 |
| 18'/130° C. | 70–80 | 165 | 87 | 4.4–5.0 | 0 | 70 | 81 |
| 20'/130° C. | 70–100 | 170 | 91 | 4.9–5.6 | 0 | 80 | 84 |

EXAMPLE 6

6a. Blocked polyisocyanate:

To 550 parts by wt. of the adduct of 2 moles of IPDI and 1 mol of diethylene glycol described in Example 2a and at 100° C. were added dropwise 196 parts by wt. of 2,4-dimethylimidazoline so that the temperature did not exceed 110° C. After addition of all the 2,4-dimethylimidazoline, the reaction mixture was kept at 110° C. for another 2 hours. In the reaction product there prepared no NCO could any longer be detected. The reaction product is a colorless powder with a melting range of 100°–107° C. and a softening point of 60°–95° C.

6b. 1,2-epoxide compound:

The epoxide described in Example 1b was used.

6c. Pigmented powdery coating medium:

As in Example 1c a pigmented lacquer was prepared with the following recipe, applied and baked on between 160° and 180° C.

Epoxide as in 1b—1216.1 parts by wt.
Masterbatch vehicle as in 1c—125.0 parts by wt.
Blocked IPDI as in 6a—158.9 parts by wt.

White pigment (TiO₂)—1000.0 parts by wt.

The mechanical properties of the resultant lacquer films are given in the following table.

| Bake-on Conditions Time/Temp. | Mechanical Data | | | | | | |
|---|---|---|---|---|---|---|---|
| | FT | HK | HB | EP | GT | Imp rev. | GG 60° C. |
| 8'/200° C. | 70–90 | 181 | 91 | 4.9–5.8 | 0 | 70 | 83 |
| 10'/200° C. | 60–90 | 184 | 100 | 5.7–6.0 | 0 | >82 | 81 |
| 12'/200° C. | 55–85 | 183 | 100 | 5.6–6.3 | 0 | >82 | 84 |
| 10'/190° C. | 50–80 | 179 | 87 | 5.1–5.9 | 0 | 80 | 86 |
| 12'/190° C. | 80–100 | 184 | 100 | 5.8–6.4 | 0 | >82 | 83 |
| 14'/190° C. | 65–105 | 183 | 111 | 5.8–6.6 | 0 | >82 | 85 |
| 12'/180° C. | 70–90 | 180 | 91 | 5.1–6.3 | 0 | >82 | 82 |
| 14'/180° C. | 65–85 | 178 | 100 | 6.2–6.8 | 0 | >82 | 87 |
| 16'/180° C. | 55–80 | 184 | 91 | 6.9–7.0 | 0 | >82 | 85 |
| 16'/170° C. | 60–80 | 182 | 87 | 6.4–7.1 | 0 | 70 | 85 |
| 18'/170° C. | 50–90 | 186 | 100 | 6.1–6.9 | 0 | >82 | 88 |
| 18'/160° C. | 70–100 | 185 | 91 | 5.5–5.8 | 0 | 70 | 81 |
| 20'/160° C. | 65–105 | 181 | 91 | 5.4–5.9 | 0 | 80 | 83 |

EXAMPLE 7

7a. Blocked polyisocyanate:

To a melt of 292 parts by wt. of 2-phenylimidazoline 174 parts by wt. of toluylene-2,4-(2,6)-diisocyanate (80% of 2,4 and 20% of 2,6) were added drop wise so that the temperature in the reaction flask did not go above 140° C. For completion of the reaction the mixture was held at 140° C. for 3 hr. These conditions sufficed for an almost total conversion (NCO content of 0.2% in the reaction product). The reaction product is a white crystalline powder with a melting range of 90°–103° C., a glass transition temperature (DTA) of 78°–90° C. and a cleavage temperature of about 130° C.

7b. 1,2-epoxide compound:

The epoxide described in Example 16 was used.

7c. Pigmented powdery coating medium:

As in Example 1c a pigmented powder lacquer was prepared with the following recipe, applied and baked on at 160° C. and 180° C.

Epoxide as in 1b—1270 parts by wt.
Masterbatch vehicle as in 1c—125 parts by wt.
Blocked TDI as in 7a—105 parts by wt.
White pigment (TiO₂)—1000 parts by wt.

| Baked-on Conditions Time/Temp. | Mechanical Data | | | | | | |
|---|---|---|---|---|---|---|---|
| | FT | HK | HB | EP | GT | Imp rev. | GG 60° |
| 10'/180° C. | 60–70 | 181 | 91 | 6.7–5 | 0 | 60 | 91 |
| 12'/180° C. | 70–90 | 184 | 100 | 6.3–8 | 0 | 82 | 90 |
| 14'/180° C. | 50–70 | 190 | 100 | 7.1–8.5 | 0 | 82 | 92 |
| 20'/160° C. | 55–80 | 188 | 100 | 6.5–7.8 | 0 | 70 | 89 |
| 25'/160° C. | 70–85 | 191 | 100 | 6.9–8.3 | 0 | 82 | 92 |

The lacquer films, baked on at 180° C. within 12', were subjected to the boiling water test and showed no deterioration after 72 hours.

EXAMPLE 8

8a. Blocked polyisocyanate:

To a mixture of 174 parts by wt. of toluylene-2,4-(2,6)-diisocyanate (80% of 2,4 and 20% of 2,6) and 300 parts by wt. of water-free acetone were slowly added dropwise at room temperature 196 parts by wt. of 2,4-dimethylimidazoline, which had been dissolved in 500 parts by wt. of water-free acetone. After addition of all the 2,4-dimethylimidazoline the mixture was kept at 50° C. for 1 hr., the acetone distilled off and the last traces of acetone removed in the vacuum drying chamber at 60° C. (NCO content of the reaction product, 0.1%). The 2,4-dimethylimidazoline-blocked diisocyanate is a white powder with a melting range of 85°–105° C., a glass transition temperature (DTA) of 70°–91° C. and a cleavage temperature of about 150° C.

8b. 1,2-epoxide compound:

The epoxide described in Example 1b was used.

8c. Pigmented powdery coating medium:

As in Example 1c pigmented powder lacquers were prepared, applied and baked on.

| | c₁ | c₂ | |
|---|---|---|---|
| Epoxide as in 1b: | 1315 | 1285.4 | parts by wt. |
| Masterbatch vehicle as in 1c: | 125 | 125 | parts by wt. |
| Blocked TDI as in 8a: | 60 | 89.6 | parts by wt. |
| White pigment (TiO₂) | 1000 | 1000 | parts by wt. |

The pigmented powder lacquer of 8c, was baked on at 160° C. and 180° C.

| Bake-on Conditions Time/Temp. | Mechanical Data | | | | | | |
|---|---|---|---|---|---|---|---|
| | FT | HK | HB | EP | GT | Imp rev. | GG 60° |
| 10'/180° C. | 75–95 | 182 | 91 | 5.1–6.5 | 0 | 70 | 83 |
| 12'/180° C. | 70–85 | 184 | 100 | 6.4–7.1 | 0 | 82 | 85 |
| 16'/160° C. | 60–90 | 181 | 91 | 5.2–5.9 | 0 | 60 | 84 |
| 18'/160° C. | 80–106 | 186 | 111 | 5.8–6.7 | 0 | 82 | 87 |
| 20'/160° C. | 75–90 | 185 | 100 | 6.1–7.0 | 0 | 82 | 83 |

The pigmented powder lacquer of Example 8c₂, which was baked on between 160° C. and 180° C., exhibits a significantly improved elasticity.

| Bake-on Conditions Time/Temp. | Mechanical Data | | | | | | |
|---|---|---|---|---|---|---|---|
| | FT | HK | HB | EP | GT | Imp rev. | GG 60° |
| 6'/180° C. | 50–70 | 187 | 100 | 4.9–5.9 | 0 | 70 | 83 |
| 8'/180° C. | 80–90 | 185 | 100 | 5.6–6.8 | 0 | 82 | 81 |
| 10'/180° C. | 75–95 | 188 | 111 | 7.1–7.5 | 0 | 82 | 87 |
| 8'/170° C. | 55–65 | 186 | 100 | 6.5–7.1 | 0 | 82 | 84 |
| 10'/170° C. | 70–80 | 189 | 111 | 7.3–8.4 | 0 | 82 | 85 |
| 10'/160° C. | 60–75 | 184 | 111 | 7.9–8.4 | 0 | 82 | 88 |
| 12'/160° C. | 70–85 | 187 | 111 | 8.1–8.8 | 0 | 82 | 84 |

We claim:

1. A curable finely divided solid composition comprising (1) an epoxy compound having more than one 1,2-epoxide group and having a lower fusion point of at least 40° C. and (2) 2–15%, by weight, based on the solid epoxy compound, of a blocked polyisocyanate formed by the reaction of a polyisocyanate with a compound of the formula

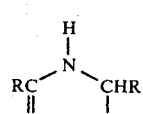

wherein each R is independently selected from hydrogen, alkyl, cycloalkyl, aralkyl, and aryl radicals.

2. A curable finely divided solid composition comprising (1) an epoxy compound having more than one 1,2-epoxide group and having a lower fusion point of at least 40° C. and (2) 2–15% by weight, based on the solid epoxy compound, of a blocked polyisocyanate formed by the reaction of (a) an isocyanate terminated prepolymer obtained by reaction of a polyol with a polyisocyanate, with (b) a compound of the formula

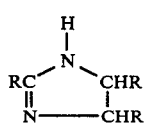

wherein each R is independently selected from hydrogen, alkyl, cycloalkyl, aralkyl, and aryl radicals.

3. A curable finely divided solid coating composition having a particle size of less than 0.25 mm comprising:
   (i) an epoxy compound having more than one 1,2-epoxide group and having a lower fusion point greater than 40° C.;
   (ii) lacquer additives; and
   (iii) 2-15 wt.% based on the solid epoxy compound of polyisocyanates blocked with cyclic amidines of the formula:

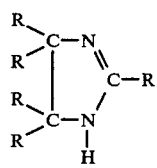

wherein the R's are the same or different and are selected from the group consisting of hydrogen, alkyl, cycloalkyl, aralkyl and aryl.

4. The coating composition of claim 3, wherein the polyisocyanate blocked with cyclic amidines is blocked diisocyanate of the general formula:

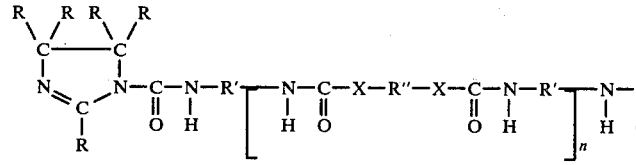

wherein n is 0 or 1, X is O, S or an NH group, R' is an alkylene, cycloalkylene or arylene radical and R" is a saturated or unsaturated alkylene group with 2-18 C atoms optionally substituted by one or more alkyl radicals, where more than one radical can also jointly form a component of a cycloaliphatic ring, and optionally containing one or more oxygen or sulfur atoms in the hydrocarbon chain, or it is a cycloalkylene group.

5. A method for preparing the coating composition which comprises:
   a. admixing a solid epoxide compound having more than one 1,2-epoxide group and having a lower fusion point of greater than 40° C. with a polyisocyanate blocked by a cyclic amidine of the formula:

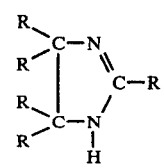

wherein the R's are the same or different and are selected from the group consisting of hydrogen, alkyl, cycloalkyl, aralkyl and aryl;
   b. extruding the admixture at a temperature at least 30° C. below the splitting temperature of said blocked polyisocyanate; and
   c. grinding the extruded mixture to a particle size less than 0.25 mm.

6. The method of claim 5, wherein a lacquer additive is admixed with said solid epoxide compound and blocked isocyanate prior to extrusion.

7. The method of claim 5, wherein the extruded mixture is ground to a particle size of less than 100μ.

8. The method of claim 5, wherein the extruded mixture is ground to a particle size of between 20 and 60μ.

9. The method of claim 5, wherein the extruded mixture is ground to a particle size of between 10 and 50μ.

10. A method of coating a substrate which comprises:
   a. applying to said substrate the coating composition comprising:
     (i) an epoxy compound having more than one 1,2-epoxide group and having a lower fusion point greater than 40° C.;
     (ii) lacquer additives; and
     (iii) 2-15% based on the solid epoxy compound of polyisocyanates blocked with cyclic amidines of the formula:

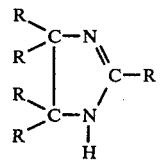

wherein the R's are the same or different and are selected from the group consisting of hydrogen, alkyl, cycloalkyl, aralkyl and aryl; and
   b. heating at a temperature above the splitting temperature of the blocked polyisocyanate.

* * * * *